United States Patent [19]

Morisada

[11] Patent Number: 5,345,571
[45] Date of Patent: Sep. 6, 1994

[54] SYSTEM FOR CONTROLLING BRANCH HISTORY TABLE

[75] Inventor: Tsuyoshi Morisada, Tokyo, Japan

[73] Assignee: NEC Corporation, Tokyo, Japan

[21] Appl. No.: 102,501

[22] Filed: Aug. 5, 1993

Related U.S. Application Data

[63] Continuation of Ser. No. 558,456, Jul. 27, 1990, abandoned.

[30] Foreign Application Priority Data

Jul. 28, 1989 [JP] Japan .................................. 1-194292

[51] Int. Cl.⁵ .............................................. G06F 9/32
[52] U.S. Cl. .................................... 395/375; 395/800; 364/261.3; 364/263.1; 364/DIG. 1
[58] Field of Search ............................... 395/375, 800; 364/261.3, 263.1

[56] References Cited

U.S. PATENT DOCUMENTS

| | | |
|---|---|---|
| 3,559,183 | 1/1971 | Sussenguth. |
| 4,679,141 | 7/1987 | Pomerene et al. ................. 395/375 |
| 4,763,245 | 9/1988 | Emma et al. ........................ 395/375 |
| 4,764,861 | 8/1988 | Shibuya ............................... 395/375 |
| 4,853,840 | 8/1989 | Shibuya ............................... 395/375 |
| 4,881,170 | 11/1989 | Morisada ............................ 395/375 |
| 4,984,154 | 1/1991 | Hanatani et al. .................... 395/375 |
| 5,168,557 | 12/1992 | Shibuya ............................... 395/375 |
| 5,175,827 | 12/1992 | Morisada ............................ 395/375 |

*Primary Examiner*—Gareth D. Shaw
*Assistant Examiner*—Dennis M. Butler
*Attorney, Agent, or Firm*—Foley & Lardner

[57] ABSTRACT

A system for controlling a branch history table in a data processing apparatus which has a memory for storing a branch instruction address and a branch destination address corresponding to the branch instruction in a one-to-one correspondence as the branch history table and which employs a virtual storage scheme includes a first register, a second register, a comparator, and a controller. The first register stores the branch instruction address including a virtual space number. The second register stores the branch destination address including the branch virtual space number. The comparator compares the virtual space numbers stored in the first and second registers. The controller enables storage of the branch history table in the memory when a coincidence is established as a result of comparison.

6 Claims, 1 Drawing Sheet

SYSTEM FOR CONTROLLING BRANCH HISTORY TABLE

This application is a continuation, of application Ser. No. 07/558,456, filed Jul. 27, 1990, abandoned.

BACKGROUND OF THE INVENTION

The present invention relates to a system having a branch history table to control a storage state of a branch history table in a data processing apparatus having a virtual storage scheme.

A conventional data processing apparatus using a branch history table is disclosed in Japanese Patent Publication No. 50-22384. Various types of existing data processing apparatuses employ branch history tables.

Some conventional data processing apparatuses employing a virtual storage scheme and a virtual address 3, as shown in FIG. 2, consist of a virtual space number 1 and a relative virtual address 2. Upper bits of the virtual address 3 are assigned to the virtual space number 1, and lower bits are assigned to the relative virtual address 2. An address of a branch instruction corresponding to the virtual address 3 and a branch destination address corresponding to the branch instruction address are stored in a branch history table.

If virtual space numbers included in the branch instruction address and the branch destination address are different from each other, the corresponding address virtual spaces are different from each other. When a virtual space previously present during OS processing disappears, the branch instruction cannot be executed due to the absence of the address virtual spaces even if the address present in the branch history table is operated, thus causing an overhead problem.

SUMMARY OF THE INVENTION

It is an object of the present invention to provide a system for controlling a branch history table, which can solve an overhead problem.

In order to achieve the above object of the present invention, there is provided a system for controlling a branch history table in a data processing apparatus which has a memory for storing a branch instruction address and a branch destination address corresponding to the branch instruction in a one-to-one correspondence as the branch history table and which employs a virtual storage scheme, comprising a first register for storing the branch instruction address including a virtual space number, a second register for storing the branch destination address including the branch virtual space number, comparing means for comparing the virtual space numbers stored in the first and second registers, and control means for enabling storage of the branch history table in the memory when a coincidence is established as a result of comparison.

When the virtual space number of the branch instruction address coincides with that of the branch destination address, the addresses are stored as the branch history table by the memory. Therefore, a disabled state of the branch instruction which is caused by a noncoincidence of the virtual space numbers can be eliminated.

DESCRIPTION OF THE PREFERRED EMBODIMENT

The present invention will be described in detail with reference to a preferred embodiment in conjunction with FIG. 1.

Figure 1:
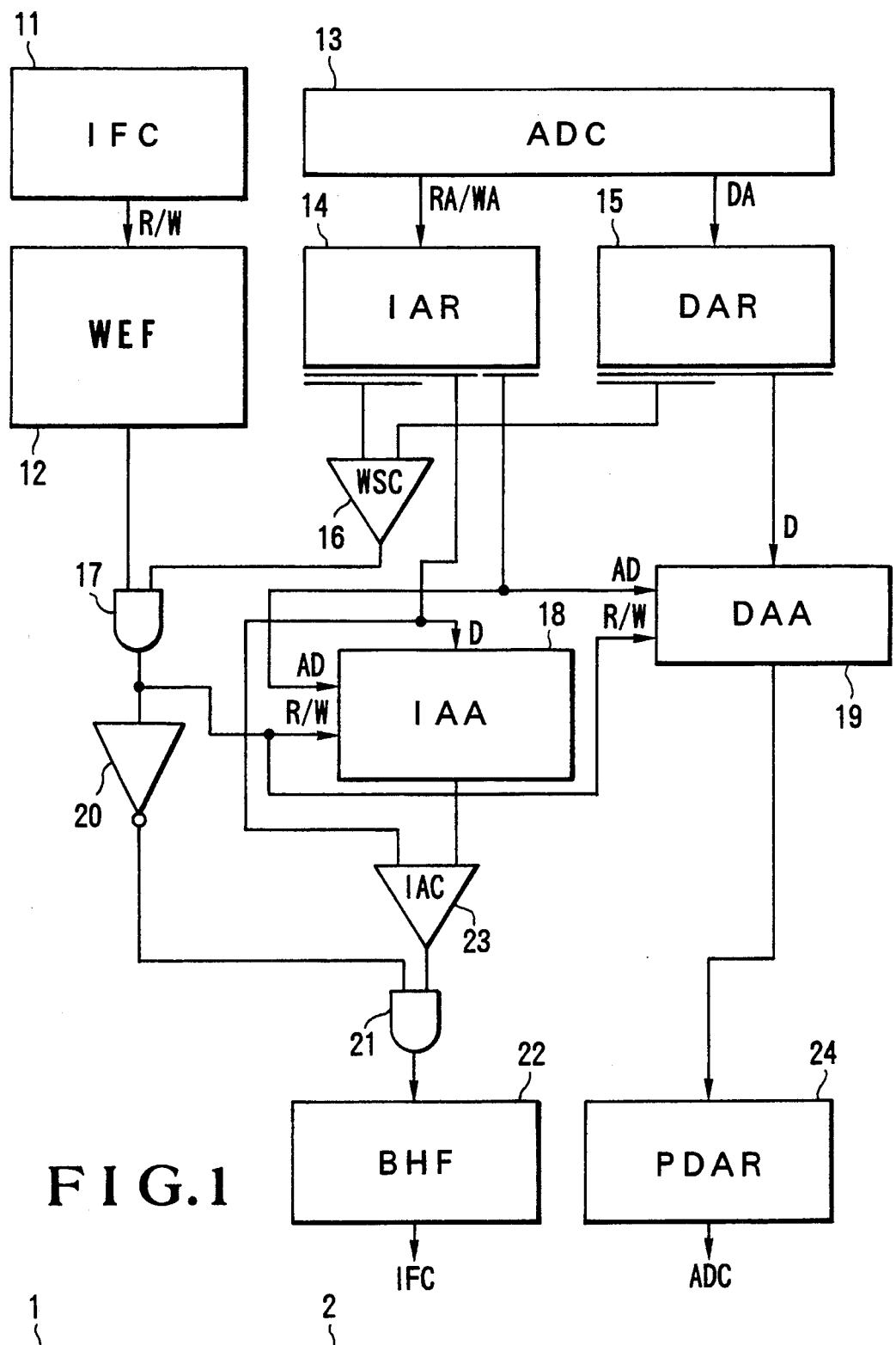
FIG. 1 is a block diagram showing an embodiment of the present invention.
Figure 2:
FIG. 2 is a format showing an arrangement of virtual addresses.

Referring to FIG. 1, a read/write signal R/W is supplied from an instruction controller (to be referred to as an IFC hereinafter) 11 to a write flag flip-flop (to be referred to as a WEF) 12. In a write mode, the WEF 12 is set. In a read mode, the WEF 12 is reset. An instruction read address/branch instruction address RA/WA and a branch destination address DA from an address generator (to be referred to as an ADC hereinafter) 13 are supplied to an instruction address register (to be referred to as an IAR hereinafter) 14 and a branch destination address register (to be referred to as a DAR hereinafter) 15, respectively. In the write mode, the branch instruction address WA including the virtual space number and the branch destination address DA including the branch space number are stored in the IAR 14 and the DAR 15, respectively.

The virtual space numbers stored in the IAR 14 and the DAR 15 are compared by a virtual space number comparator (to be referred to as a WSC hereinafter) When a coincidence is established by the WSC 16, the WSC 16 generates a comparison output of level "1". This output supplied to an AND gate 17. At this time, since the output from the WEF 12 is set at level "1", an output from the gate 17 goes to level "1", which is supplied to a branch instruction memory (to be referred to as an IAA hereinafter) 18 and a branch destination memory (to be referred to as a DAA hereinafter) 19. The IAA 18 and the DAA 19 are set in a write enable state. The upper bits of the branch instruction address WA and the branch destination address DA of the DAR 25 are stored in the IAA 18 and the DAA 19 at addresses designated by the lower bits of the branch instruction address WA in a one-to-one correspondence in the form of a branch history table.

An output from the AND gate 17 is inverted to level "0" by an inverter (to be referred to as an INV hereinafter) 20 to set the output from an AND gate 21 to be "0". The output of level "0" is supplied as an instruction read disable signal to the IFC 11 in order to reset branch hit flag flip-flop circuit (to be referred to as a BHF hereinafter) 22.

When storage of the branch instruction address WA and the branch destination address DA is completed, as described above, the IFC 11 sets the signal R/W to "0", which represents a read mode. The WEF 12 is reset to output a signal of "0", so that an output from the AND gate 17 goes to level "0". At the same, an output from the INV 20 goes to level "1". Therefore, the AND gate 21 is set in an ON state.

When the instruction read address RA is supplied from the ADC 13, it is stored in the IAR 14, and its lower bits are supplied as a read address for the IAA 18 and the DAA 19. Contents of the IAA 18 and the DAA 19 are read out. The content of the IAA 18 is supplied to an instruction address comparator (to be referred to as an IAC hereinafter) 23, and the branch destination address from the DAA 19 is stored in a predictive branch destination address register (to be referred to as a PDAR hereinafter) 24. This register content is output to the ADC 13.

At this time, the IAC 23 compares the upper bits of the IAR 14 with the content of the IAA 18. If a coincidence is established, a comparison output of level "1" is output. In response to this comparison output, an output from the AND gate 21 goes to level "1" to set the BHF 22. An output from the BHF 22 goes to level "1". This signal is supplied to the IFC 11 as a significant read signal.

In the write mode of the IAA 18 and the DAA 19, the WSC 16 checks a coincidence between the virtual space numbers of the addresses WA and DA. The storage operation is performed on the assumption of this coincidence. The histories of the addresses WA and DA are stored in the IAA 18 and the DAA 19 in the form of branch history tables. In the read mode of the IAA 18 and the DAA 19, the IAC 23 checks a coincidence between the instruction address WA consisting of the upper bits of the IAR 14 and the instruction address stored in the IAA 18 and read out therefrom. The branch destination address from the PDAR 24 becomes valid in accordance with this coincidence. The disabled state of the branch instruction by the noncoincidence between the virtual space numbers can be perfectly eliminated.

As has been described above in detail, according to the present invention, the virtual space numbers assigned to the branch instruction address and the branch destination address are compared with each other. The addresses are stored in the form of branch history tables in accordance with the coincidence of these virtual space numbers. The disabled state of the branch instruction on the basis of the noncoincidence between the virtual space numbers can be perfectly eliminated. No overhead problem is posed, and many advantages can be provided in various types of data processing apparatuses using branch history tables and virtual storage schemes.

What is claimed is:

1. A system for controlling a branch history table in a data processing apparatus which has a memory for storing a branch instruction address and a branch destination address, corresponding to the branch instruction in a one-to-one correspondence, as said branch history table and which employs a virtual storage scheme, comprising:

a first register for storing the branch instruction address, said branch instruction address including a virtual space number which will be stored in said branch history table;

a second register for storing the branch destination address corresponding to said branch instruction address stored in said first register, said branch destination address including a branch virtual space number, which will be stored in said branch history table;

comparing means, connected to said first and second registers, for comparing the virtual space number stored in said first register and the branch virtual space number stored in said second register and outputting a compare signal to indicate a coincidence; and control means, receiving said compare signal, for enabling storage of said branch instruction address stored in said first register and said branch destination address stored in said second register in said branch history table in said memory when a coincidence is established as a result of comparison by said comparing means.

2. A system according to claim 1, wherein said control means allows storage of said branch instruction address stored in said first register and said branch destination address stored in said second register in said branch history table in said memory only when a write signal, being supplied to said branch history table, indicating time to store said branch instruction address and said branch destination address in said branch history table, is output from an instruction controller and said comparing means detects the coincidence.

3. A system according to claim 2, further comprising means for supplying an instruction read inhibit signal to said instruction controller when storage of said branch instruction address stored in said first register and said branch destination address stored in said second register in said branch history table in said memory is allowed, and for disabling the instruction read inhibit signal when the storage is completed.

4. A system according to claim 1, further comprising an instruction address comparator for determining whether the branch instruction address from said first register coincides with a previously stored branch instruction address read out from said memory when an instruction read address is supplied to said first register.

5. A system according to claim 4, further comprising means for validating read access to said branch history table to read a predicted branch destination address, when said instruction address comparator detects a coincidence.

6. A system according to claim 5, further comprising means for validating the branch destination address read out from said memory, as said predicted branch destination address, upon detection of the coincidence by said instruction address comparator when the instruction read address is supplied to said first register.

* * * * *